United States Patent [19]

Veith et al.

[11] Patent Number: 5,557,694
[45] Date of Patent: Sep. 17, 1996

[54] METHOD OF DETERMINING THE ZERO DISPERSION WAVELENGTH OF AN OPTICAL WAVEGUIDE

[75] Inventors: Gustav Veith, Bad Liebenzell; Henning Bülow, Stuttgart, both of Germany

[73] Assignee: Alcatel N.V., Rijswijk, Netherlands

[21] Appl. No.: 409,758

[22] Filed: Mar. 24, 1995

[30] Foreign Application Priority Data

Mar. 30, 1994 [DE] Germany .................. 44 11 063.4

[51] Int. Cl.$^6$ ............................................. G02B 6/28
[52] U.S. Cl. ............................ 385/27; 385/24; 385/147
[58] Field of Search .......................... 385/27, 15, 24, 385/39, 45, 46, 123, 122, 147

[56] References Cited

U.S. PATENT DOCUMENTS

| | | | |
|---|---|---|---|
| 5,195,160 | 3/1993 | Byron | 385/123 |
| 5,377,294 | 12/1994 | Onishi et al. | 385/24 |
| 5,416,864 | 5/1995 | Cassidy et al. | 385/24 |

OTHER PUBLICATIONS

"Optical Waveguide Technology" by D. Lutzke, Pflaum-Publishers, Munich 1986, pp. 35–42.
"Single–Mode Fibers", by E. G. Neumann, Springer–Publishers, 1988, pp. 408–422.
"Four–Wave Mizing in an Optical Fiber in the Zero–Dispersion Wavelength Region", Journal of Lightwave Technology vol. 10, No. 11, Nov. 1992, pp. 1553–1561.
Patent Abstracts of Japan, vol. 940, No. 012 & JP–A–06 331495 (Mitsubishi Electric Corp) 2 Dec. 1994.
Patent Abstracts of Japan, vol. 017, No. 596 (P–1636), Oct. 1993 & JP–A–05 180729 (Nippon Teleg & Telph Corp) 23 Jul. 93.
Patent Abstracts of Japan, vol. 13, No. 176 (E–749), 25 Apr. 1989 & JP=A–01 005085 (NEC Corp) 10 Jan. 1989.
Patent Abstracts of Japan, vol. 013 No. 149 (P–855), 12 Apr. 1989 & JP–A–63 311309 (Sumitomo Electric Ind. Ltd) 20 Dec. 1988.
Patent Abstracts of Japan, vol. 011 No. 345 (P–636), 12 Nov. 1987 & JP–A–62 127640 (Hitachi Cable Ltd) 9 Jun. 1987.

*Primary Examiner*—John Ngo
*Attorney, Agent, or Firm*—Ware, Fressola, Van Der Sluys & Adolphson

[57] ABSTRACT

It is necessary to know the zero dispersion wavelength $\lambda_o$, to ensure the reliable transmission of high bit-rate frequency signals via remote transmission paths. The method for determining the zero dispersion wavelength of an optical waveguide knowingly utilizes a disturbing effect that is undesirable in optical communications transmission techniques, which is able to lower the transmission quality. This effect is the so-called four-wave mixing, or in special cases a partially degenerated four-wave mixing. The method couples two light signals of different wavelengths ($\lambda_1$, $\lambda_2$) into an optical waveguide (4). A mixing product which occurs in the optical waveguide as a result of a partially degenerated four-wave mixing is evaluated by an analyzer (3). The wavelength of one of the two light signals is selectively varied until the optical output of the mixing product reaches a maximum. At that point the wavelength of this light signal coincides with the zero dispersion wavelength $\lambda_o$.

6 Claims, 1 Drawing Sheet

METHOD OF DETERMINING THE ZERO DISPERSION WAVELENGTH OF AN OPTICAL WAVEGUIDE

TECHNICAL FIELD

The invention concerns a method and a device for determining the zero dispersion wavelength of an optical waveguide, In addition, the invention concerns a method for controlling the wavelength of a light source, and an optical communications transmission system in which this method is used.

BACKGROUND OF THE INVENTION

When optical signals with a very high bit-rate frequency are transmitted over remote transmission paths, e.g. trans-atlantic paths, chromatic dispersion represents a magnitude that limits the bit-rate frequency and/or the transmission length. A measure of the quality of an optical transmission system is e.g. the product of the bit-rate frequency and the transmission length.

An optical communications transmission system, whose minimum configuration comprises a light source, an optical waveguide and an optical receiver, is generally known.

Chromatic dispersion means that the group velocity, i.e. the velocity at which the optical signal propagates through the optical waveguide, is wavelength-dependent.

This causes each spectral component of a pulse to propagate at a different velocity in the optical waveguide. Thus, depending on its spectral width, a narrowly coupled pulse expands more or less as a result of running time differences. The product of the bit-rate frequency and the transmission length is therefore limited.

The mentioned chromatic dispersion is composed of the material dispersion and the waveguide dispersion. A more elaborate treatment of the dispersion can be found e.g. in the book "Optical Waveguide Technology", by D. Lutzke, Pflaum-Publishers, Munich 1986, pages 35–42.

Commercially available single-mode standard fibers have a zero dispersion wavelength $\lambda_0$ at about 1.3 µm and so-called dispersion shifted fibers (DSF) at about 1.55 µm. The zero dispersion wavelength $\lambda_0$ is the wavelength at which the dispersion, indicated in ps/(nm= km), is zero.

Transmission at the zero dispersion wavelength $\lambda_0$ is desired above all at the highest bit-rate frequencies in conjunction with a remote transmission path, in order to prevent pulse propagation due to the dispersion. This requires precise knowledge of zero dispersion wavelength $\lambda_0$.

Numerous methods for measuring the chromatic dispersion of optical waveguides are known, e.g. the differential pulse-time delay measurement and the pulse propagation measurement. Such methods are indicated e.g. in E. G. Neumann: "Single-Mode Fibers", Springer-Publishers, 1988, pages 408 to 422.

These methods of determining chromatic dispersion are relatively expensive technologies. For example, for the pulse-time delay measurement, several lasers are required to emit pulses of different wavelengths, and determining the zero dispersion wavelength by approximation methods is subject to considerable measuring inaccuracies.

Carrying out the known methods is particularly expensive if the chromatic dispersion of already dispersed optical waveguide paths must be determined. Dispersed optical waveguide paths are usually spliced partial paths, whose optical waveguides have different zero dispersion wavelengths. This can be due to the production or the environment (e.g. due to temperature, pressure). Determining the average zero dispersion wavelength $\lambda_0$ of the entire path is thus even more expensive and inaccurate.

SUMMARY OF THE INVENTION

One task of the invention is to present a more accurate and technically less demanding method for determining the zero dispersion wavelength $\lambda_0$ of an optical waveguide. This task is fulfilled by a method of determining the zero dispersion wavelength of an optical waveguide; wherein two light signals of different wavelengths ($\lambda_1$, $\lambda_2$) are coupled into the optical waveguide; wherein a mixing product resulting from a nonlinear interaction of the two light signals is detected in the optical waveguide; wherein the wavelength of one of the light signals, which is tunable over a range wherein the zero dispersion wavelength is expected, is selectively varied until the optical output of the mixing product reaches a maximum and the wavelength of this light signal is equal to the zero dispersion wavelength; and wherein the wavelength of the other light signal is chosen so that it lies outside of the range of the expected zero dispersion wavelength.

Another task of the invention is to present a device wherein this method is used. This task is fulfilled by a device for determining the zero dispersion wavelength of an optical waveguide, comprising two light sources for emitting light signals of different wavelengths ($\lambda_1$, $\lambda_2$); means for coupling these light signals into the optical waveguide; an analyzer connected to the waveguide for detecting a mixing product resulting from a nonlinear interaction of the two light signals in the optical waveguide; means for tuning the wavelength of one of the light signals over a range of the expected zero dispersion wavelength; and for selectively varying the wavelength until the optical output of the mixing product reaches a maximum and the wavelength of this light signal thereby equals the zero dispersion wavelength; and means for choosing the wavelength of the other light signal so that it lies outside of the range in which the zero dispersion wavelength is expected.

In addition, the invention has the task of presenting a method for controlling the wavelength of a light source, so that this wavelength is equal to the zero dispersion wavelength $\lambda_0$. This task is fulfilled as indicated by a method of controlling the wavelength ($\lambda_1$) of a first light signal from a first light source of an optical communications transmission system; wherein the first light signal, and a second light signal of a second wavelength ($\lambda_2$) emitted by a second light source, are coupled into an optical waveguide on the transmitting side; wherein the second wavelength ($\lambda_2$) of the second light signal is chosen so that it does not equal the zero dispersion wavelength of the optical waveguide; wherein a portion of the light on the receiving side is coupled out; wherein a mixing product contained in this light and resulting from a nonlinear interaction of the light signals in the optical waveguide can be evaluated by an evaluating device; wherein a controller derives a correcting variable therefrom; and wherein this correcting variable is used to control the first wavelength ($\lambda_1$) of the first light source in order to maximize the optical output of the mixing product.

Furthermore, the invention has the task of presenting an optical communications transmission system that uses this method. This task is fulfilled by an optical communications transmission system, comprising a first light source controllable by a correcting variable signal, the first light source for emitting a first light signal of a first wavelength ($\lambda_1$); a second light source, for emitting a second light signal of a second wavelength ($\lambda_2$); means for coupling the two light signals into an optical waveguide, wherein the second wavelength ($\lambda_2$) of the second light signal does not equal the zero dispersion wavelength of the optical waveguide; means for coupling out a portion of the light in the optical waveguide; an evaluating device receiving the portion of light coupled out of the optical waveguide, wherein a mixing product contained in this light and resulting from a nonlinear interaction of the light signals in the optical waveguide is evaluated by the evaluating device and presented at an output; a controller connected to the output of the evaluating device, the controller generating a correcting variable signal derived from the evaluated mixing product; and means for communicating the correcting variable signal to the first light source so that the first wavelength ($\lambda_1$) of the first light source is controlled to maximize the optical output of the mixing product.

Advantageous configurations of the invention can be found in the subclaims.

An advantage of the invention's method for determining the zero dispersion wavelength $\lambda_0$ is that it is suitable for already installed, spliced optical waveguide paths, as well as for optical waveguides that must be individually tested.

BRIEF DESCRIPTION OF THE DRAWINGS

The invention will be explained in greater detail in the following, where.

BEST MODE FOR CARRYING OUT THE INVENTION

The method of the invention utilizes the four-wave mixing (FWM) effect, which is known from K. Inoue: Four-Wave Mixing in an Optical Fiber in the Zero-Dispersion Wavelength Region", Journal of Lightwave Technology, Vol. 10, No. 11, November 1992, pages 1553 to 1561. It describes the nonlinear effect which occurs in optical waveguides wherein nonlinear interactions of three light signals of different wavelengths produce a fourth light signal, a mixing product with a fourth wavelength. This leads to undesirable disturbances, particularly in a multichannel transmission system.

Figure 1:
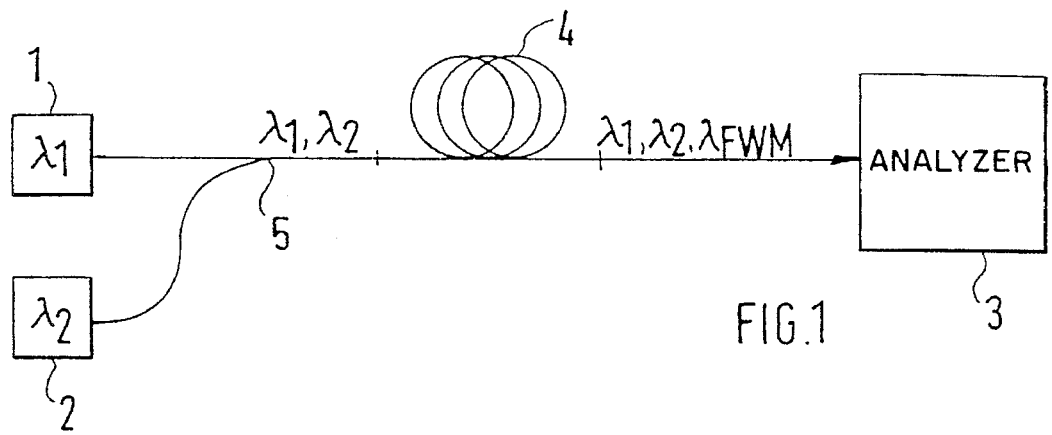
FIG. 1 depicts a device for determining the zero dispersion wavelength of an optical waveguide.

If only two light signals are supplied to the optical waveguide instead of the three light signals, it is called a partially degenerated four-wave mixing. Both cases are illustrated in FIG. 1 of the indicated K. Inoue document.

In the partially degenerated case, the maximum conversion of optical output of the light signal to the mixing product takes place at the frequency $f_{FWM}$, when the frequency $f_i$ of the other light signal is equal to the zero dispersion wavelength $\lambda_0$ (frequency $f_o$).

With this method for determining the zero dispersion wavelength, this four-wave mixing, generally known as the disturbing effect in communications transmission techniques, is knowingly used to determine the zero dispersion wavelength $\lambda_0$ of an optical waveguide path, or to ensure transmission at the zero dispersion wavelength $\lambda_0$ in an optical communications transmission system.

In conjunction with the invention, the zero dispersion wavelength $\lambda_0$ also comprises a minimum amount of dispersion.

FIG. 1 illustrates a device for determining the zero dispersion wavelength $\lambda_0$ of an optical waveguide 4. It has a first light source 1 which emits a light signal at a first wavelength $\lambda_1$, a second light source 2 which emits a light signal at a second wavelength $\lambda_2$, a coupler 5 for coupling both light signals into the optical waveguide 4, and an analyzer 3 for evaluating the available light behind the optical waveguide 4. The analyzer 3 is e.g. a spectrum analyzer or a filter with a subsequent detector. The light sources 1, 2 are preferably tunable semiconductor lasers or fiber lasers, and the coupler 5 is e.g. a fiber coupler.

With sufficiently high optical output of the coupled light signals, which can be adjusted with potential optical amplifiers, the nonlinear interaction (partially degenerated four-wave mixing) of both light signals produces the mixing product in the optical waveguide 4 at the wavelength of the frequency $f_{FWM}$. The light available behind the optical waveguide 4 is therefore composed of the two light signals and the mixing product, at the respective wavelengths of $\lambda_1$, $\lambda_2$, $\lambda_{FWM}$.

For the purpose of clarity, the wavelengths occurring at $\lambda_1$, $\lambda_2$, $\lambda_{FWM}$ are drawn in the respective places of the optical waveguide 4.

The filters in analyzer 3 are designed to only let the wavelength $\lambda_{FWM}$ pass, so that only the optical output of the mixing product is evaluated.

To determine the zero dispersion wavelength of the optical waveguide 4 with the method used for the device illustrated in FIG. 1, the wavelength of one of the two light signals is selectively varied until the optical output of the mixing product detected by the analyzer 3 reaches a maximum. At that point, the wavelength of this light signal coincides with the zero dispersion wavelength $\lambda_0$.

A variation of the emitted wavelength of a laser can be achieved by changing the laser current, since the wavelength of the emitted light is a function of the laser current, among others.

The wavelengths $\lambda_1$, $\lambda_2$ are chosen for the device and to carry out the method so that:
they are always different,
the wavelength being varied can be tuned within the range of the expected zero dispersion wavelength $\lambda_0$, and
the wavelength that is not varied lies outside of the range of the expected zero dispersion wavelength $\lambda_0$.

Figure 2:
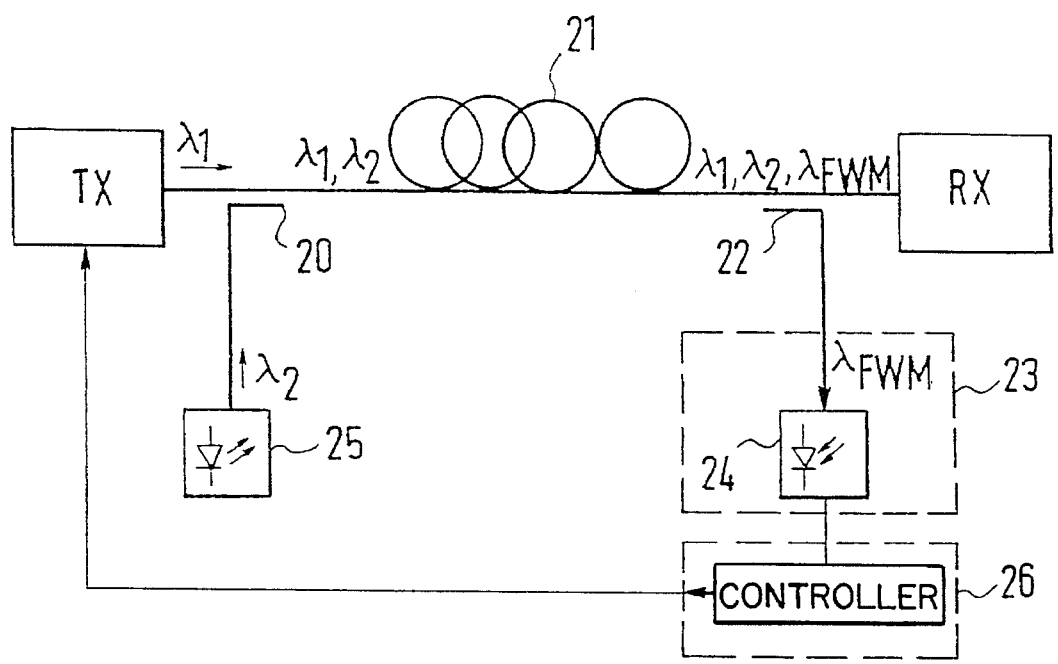
FIG. 2 depicts an optical communications transmission system with a controller and an evaluation device.

FIG. 2 depicts an example of an optical communications transmission system with the relevant components for understanding the invention. As in generally known systems, it comprises a first light source TX, which emits a first light signal that is a communications signal e.g. at a first wavelength $\lambda_1$, an optical waveguide 21 as the transmission path, and an optical receiver RX.

The communications transmission in this system takes place in one direction only. But, in principle, it can also be a system in which the communications transmission takes place in both directions. To that effect, such a system has at least one light source and at least one optical receiver at each end of the transmission path. However, this is not relevant to the invention.

In addition, the system depicted in FIG. 2 has a second light source 25, which emits a second light signal at a second wavelength $\lambda_2$, and a first coupler 20, and a second coupler 22 on the receiving side, an evaluation device 23 and a controller 26. The evaluation device 23 has a detector 24. It is connected to the first light source TX through a back-channel. The first coupler 20 couples the first light signal of the first light source TX, and the second light signal of the second light source 25, into the optical waveguide 21, in which the mixing product is created by the four-wave mixing at the wavelength $\lambda_{FWM}$, as mentioned earlier. The second light signal of the second light source 25 is not modulated with any message being transmitted. This second light signal can be a level signal or a pulsed light signal.

The second coupler 22 on the receiving side couples out a portion of the light composed of the two light signals and the mixing product, and directs it to the evaluation device 23. This evaluation device 23 only evaluates the mixing product. This can occur e.g. by positioning an optical filter between the second coupler 22 and the detector 24, which only allows the mixing product to pass, or by having the detector 24 react only to the mixing product. The controller 26 receives a signal emitted by the detector 24, from which it derives a correcting variable that is a function of the optical output of the mixing product.

This correcting variable, which is transmitted to the first light source TX through the back-channel, can be used to control the first wavelength $\lambda_1$ of the first light signal.

In general it is preferable for couplers 20, 22 to be fiber couplers; however, other means for coupling light in and out can be used, e.g. lens systems.

In principle, care must be taken that two light signals are coupled into one end of the optical waveguide 21 in such a way, that they can interact therein, and that the resulting mixing product can be evaluated at the other end of the optical waveguide 21.

With respect to the back-channel, it should be added that the transmission can be electrical or optical therein. In the system depicted in FIG. 2, the transmission of the correcting variable is electrical, i.e. this correcting variable directly controls the first light source TX. However, it is also possible to convert to an optical correcting variable before the transmission, which is then transmitted optically and is reconverted into an electrical correcting variable on the transmitting side.

In addition, it is possible to combine the evaluation device 23 with the first light source, i.e. to integrate it into an optical transmitter.

The design of the back-channel (electrical or optical; evaluation device and/or controller on the transmitting or receiving side) is not relevant to the invention. It is important that the information about the optical output of the mixing product is transmitted to the first light source TX.

In this system, the transmission must take place at the zero dispersion wavelength $\lambda_0$, i.e. the wavelength $\lambda_1$ of the first light signal must always be adapted to the optical waveguide 21 because environmental influences can change the dispersion during the operation. In this system, the wavelength $\lambda_1$ of the light signal is controlled in such a way, that the optical output of the mixing products reaches a maximum. To obtain this maximum, the wavelength $\lambda_1$ is varied (wobbled) within a range around the zero dispersion wavelength $\lambda_0$. The wavelength $\lambda_2$ of the second light signal is then always different from the zero dispersion wavelength $\lambda_0$.

This optimization of wavelength $\lambda_1$ can be performed e.g. during servicing of the system, or during the operation.

What is claimed is:

1. A method of determining the zero dispersion wavelength of an optical waveguide (4, 21), wherein two light signals of different wavelengths ($\lambda_1$, $\lambda_2$) are coupled into the optical waveguide (4, 21), wherein a mixing product resulting from a nonlinear interaction of the two light signals in the optical waveguide (4,21) is detected at the output of the optical waveguide, wherein the wavelength of one of the light signals, which is tunable over a range wherein the zero dispersion wavelength is expected, is selectively varied until the optical output of the mixing product reaches a maximum and the wavelength of this light signal is equal to the zero dispersion wavelength, and wherein the wavelength of the other light signal is chosen so that it lies outside of the range of the expected zero dispersion wavelength.

2. A device for determining the zero dispersion wavelength of an optical waveguide (4), comprising:

two light sources (1, 2) for emitting light signals of different wavelengths ($\lambda_1$, $\lambda_2$), means for coupling these light signals into the optical waveguide (4), an analyzer (3) connected to the waveguide for detecting a mixing product resulting from a nonlinear interaction of the two light signals in the optical waveguide (4), means for tuning the wavelength of one of the light signals over a range including the zero dispersion wavelength, and for selectively varying the wavelength until the optical output of the mixing product reaches a maximum and the wavelength of this light signal thereby equals the zero dispersion wavelength, and means for choosing the wavelength of the other light signal so that it lies outside of the range in which the zero dispersion wavelength is expected.

3. A method of controlling the wavelength ($\lambda_1$) of a first light signal from a first light source (TX) of an optical communications transmission system, wherein the first light signal, and a second light signal of a second wavelength ($\lambda_2$) emitted by a second light source (25), are coupled into an optical waveguide (21) on the transmitting side, wherein the second wavelength ($\lambda_2$) of the second light signal is chosen so that it does not equal the zero dispersion wavelength of the optical waveguide (21), wherein a portion of the light on the receiving side is coupled out, wherein a mixing product contained in this light and resulting from a nonlinear interaction of the light signals in the optical waveguide (21) can be evaluated by an evaluating device (23), wherein a controller (26) derives a correcting variable therefrom, and wherein this correcting variable is used to control the first wavelength ($\lambda_1$) of the first light source (TX) in order to maximize the optical output of the mixing product.

4. An optical communications transmission system, comprising:

a first light source (TX) controllable by a correcting variable signal, the first light source for emitting a first light signal of a first wavelength ($\lambda_1$), a second light source (25), for emitting a second light signal of a second wavelength ($\lambda_2$), means for coupling the two light signals into an optical waveguide (21), wherein the second wavelength ($\lambda_2$) of the second light signal does not equal the zero dispersion wavelength of the optical waveguide (21), means for coupling out a portion of the light in the optical waveguide (21), an evaluating device receiving the portion of light coupled out of the optical waveguide, wherein a mixing product contained in this light and resulting from a nonlinear interaction of the light signals in the optical waveguide (21) is evaluated by the evaluating device (23) and presented at an output, a controller (26) connected to the output of the evaluating device, the controller generating a correcting variable signal derived from the evaluated mixing product, and means for communicating the correcting variable signal to the first light source so that the first wavelength ($\lambda_1$) of the first light source (TX) is controlled to maximize the optical output of the mixing product.

5. An optical communications transmission system as claimed in claim 4, wherein the evaluating device (23) contains a detector (24) which only reacts to the wavelength of the mixing product.

6. An optical communications transmission system as claimed in claim 4, wherein the evaluating device (23) contains a detector (24) and an optical filter located before the detector (24), which only allows the wavelength of the mixing product to pass.

* * * * *